July 9, 1935.  B. SPENCE  2,007,410
CHEESE BANDAGE
Filed March 29, 1932
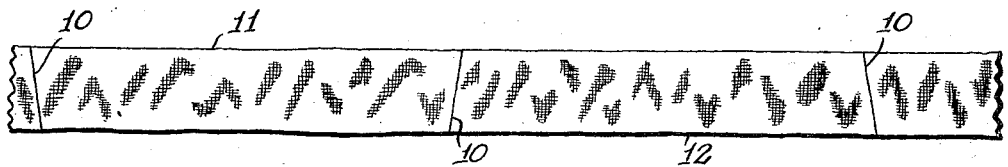
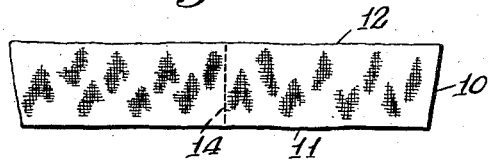
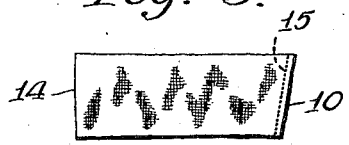
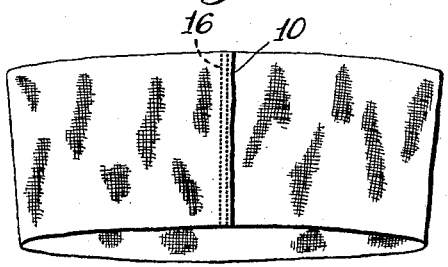
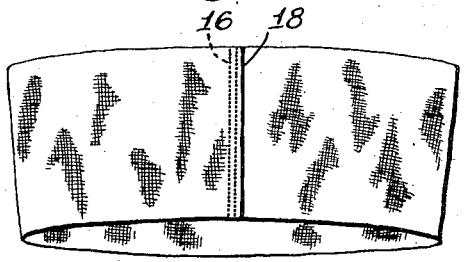
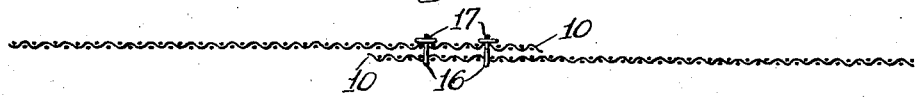
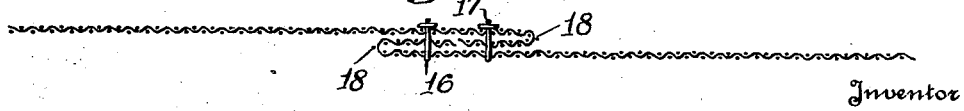
Inventor
BYRON SPENCE
By H. H. Snelling
Attorney Patented July 9, 1935

2,007,410

UNITED STATES PATENT OFFICE 2,007,410

CHEESE BANDAGE

Byron Spence, Milwaukee, Wis., assignor to Chr. Hansen's Laboratory, Inc., Little Falls, N. Y., a corporation of New York Application March 29, 1932, Serial No. 601,850

2 Claims. (Cl. 2—243)

This invention relates to cheese bandages and has for its object a particular method of cutting the cheese cloth in order to secure all of the advantages of the usual cheese bandage and, while reducing the total amount of cloth required, to improve materially the appearance of the cheese.

A further object of the present invention is the provision of a cheese bandage which does not require the turning of the bandage inside out at the place of use.

In the usual making of sewed cheese bandages the cloth is cut or torn to the right width and these cut or torn strips are then cut at right angles into rectangles each approximately two inches longer than the circumference of the cheese or, what is the same thing, the inside circumference of the metal hoop or mold in which the cheese is pressed. This usual method requires that the bandage shall be sewed on a line which is at an angle to the two alined cut edges. In accordance with the present invention, however, the line of stitching is exactly parallel to the cut edge and the saving in cloth, while quite trivial for a single bandage, amounts to a considerable sum in quantity.

Furthermore by the present invention I have provided a bandage which can be shipped as sewed and which can be used in the cheese factory without the usual turning of the bandage inside out, this being required in all earlier forms because the bandages can be shipped very neatly when they are sewed provided they are not turned inside out at the bandage factory. While a machine could readily be designed to turn the bandages inside out at the bandage factory, this would make awkward packages because the bandage if turned inside out will not lie flat. By the present method, however, no turning inside out of the bandage is necessary and the amount of the excess material is only half what it would be if the ordinary bandage were turned inside out and hence while the bandages will not lie as flat as in previous practice they will lie sufficiently flat for shipment in very neat condition.

In the drawing:—

Figure 1 is a plan view of a strip of cloth severed in any manner as by cutting or tearing to the proper width and illustrating the line of second cut.

Figure 2 is a single piece ready to be folded and made into a bandage.

Figure 3 shows a complete bandage which is very satisfactory except that it must be turned before it can be used.

Figure 4 is a modified form which does not have to be turned and which can be shipped in neat packages.

Figure 5 is a form which, altho causing a slightly greater unevenness of package has distinct advantages and will not appreciably mark the cheese.

Figure 6 is an enlarged section showing the stitching used in Figure 4.

Figure 7 is an enlarged view showing the stitching used in Figure 5.

Figure 8 is a further modification.

Practically all of the cheeses made in this country of the American or Cheddar type are put up in cylindrical shapes which vary both in diameter and in height, depending entirely upon the size of the hoop used. These cylindrical shapes are made by pressing the cheese in metal hoops or molds which latter are lined with cheese cloth which is sewed in such a fashion as to conform rather precisely to the inside shape of the hoop, such pieces of cheese cloth being technically known in the art as bandages.

To facilitate the pressing of the cheese in the press the hoops are tapered so that the bottom of one hoop will fit into the top of the next hoop. The hoops of full curd may be placed either vertically or horizontally in the cheese press, this particular invention having nothing to do with the step of pressing the cheese but merely with the making of the bandage.

In accordance with my invention instead of cutting the strips at right angles as is the case in the ordinary method, I make the cuts 10 as shown in Figure 1 at an angle to the selvedge 11 or the cut or torn edge 12, the angle being purposely exaggerated in order to emphasize the invention. In Figure 2 a single cut piece is shown, the dotted line 14 being the line of fold, this being centrally of the piece which is a trapezoid. In Figure 3 the piece of cheese cloth has been shown folded and the dotted line 15 is the line of stitching which it will be noted is exactly parallel to the diagonally cut edge 10. For convenience in illustration the small end of the bandage is uppermost in Figures 2 and 3 but it will be understood by those familiar with the art that as the bandage appears inside of the cheese hoop when the cheese is upright, the longer side of the bandage is uppermost.

The saving in cloth over the normal method of making cheese bandages runs from two to five percent, depending upon the width of the bandage and this saving when figured in terms of rolls of cheese cloth is quite material bearing in mind that there is absolutely no disadvantage, in fact the finished bandage is somewhat neater and obviously just as strong as the older type. It is neater because the less the edge of the bandage overlaps beyond the line of stitching, the better will be the appearance of the finished cheese. Cutting on a diagonal reduces the amount of cloth beyond the stitching, and therefore the amount of cloth folded back which makes an impression against the surface of the cheese.

The new method materially improves the appearance of the cheese over that of cheese on which ordinary bandage is used, for the old method leaves a big uneven overlapping piece to make an irregular impression on the surface of the cheese, while the present method leaves two small regular overlaps, the edges of which are exactly parallel to the line of stitching.

While the bandage of Figure 3 is a remarkably better bandage than the prior art, it is essential that the bandage be turned inside out prior to use. To avoid this disadvantage I have provided the modified bandages of Figures 4 and 5. In Figure 4 one of the cut edges 10 is on the outside of the bandage and the other cut edge is on the inside of the bandage as seen in Figure 6 and I close the seam by a double row of stitches. Where the line of stitches is made by a machine which uses a chain on the bottom, I prefer that the single line of stitching 16 shall be on the outside of the bandage and the chain stitching 17 shall be on the inside of the bandage. The two stitching lines are made at the same time by a well known double stitching machine, the overlap of the material being roughly one-half inch and the distance apart of the lines of stitching being one-quarter inch more or less. It will readily be seen that a bandage such as shown in Figure 4 will relieve the cheese makers of the duty of turning each bandage wrong side out at the time it is put on the bandage ring and secured in the hoop, this action being necessary in order that the overlap or flap where the two ends of the cloth are sewed together shall come next to the cheese, and shall not be on the outside and in the way where it might get torn, mussed, or ripped off during the handling of the cheese.

In Figures 5 and 7 I have shown a further modification wherein the outside raw edge is turned under to form a folded edge 18. In this modification the two cut edges of the bandage, as formed in Figure 1, are brought together so as to form a circle which, of course, is actually a cone, and with these two ends in place the twin seams are made as in Figure 7 differing from Figure 6 largely in that while the inside cut edge 10 lies flat against the other end of the strip on the inside the cut edge 10ª is turned in between the two ends and between the two lines of stitching so that on the outside instead of having a raw edge I have the folded edge 18. In the devices of both Figures 4 and 5 the two ends will lie flat against one another so that there is practically no visible seam and no appreciable end flap projecting at any point and there is no noticeable seam to mark the cheese at any point and this is obtained in addition to the big advantage of having the bandage ready to put right into the hoop without any extra work of turning it wrong side out. Figure 8 shows a still further modification in which both of the raw edges are turned under so that two folded edges 18 are formed.

What I claim is:

1. The method of making cheese bandages which consists in cutting a strip of proper width by diagonal cuts alternately left and right of a line normal to either top or bottom edge of the strip, folding the cut segments in half with their cut edges alined and closing the bandage by a line of stitching parallel to the diagonal cut.

2. A cheese bandage consisting of a trapezoid of bandage material with the two sloping cut edges lying parallel to one another so that the bandage when open may form a frustum of a cone open at both ends, said strip being closed by plural thread stitching, such stitching extending parallel to the two sloping edges and positioned so that the two raw edges of the material are both enclosed whereby no raw edge is exposed either inside or outside of the bandage.

BYRON SPENCE.